(12) United States Patent
Alberts, III et al.

(10) Patent No.: US 6,312,508 B1
(45) Date of Patent: Nov. 6, 2001

(54) FILTER ASSEMBLY FOR A VACUUM CLEANER

(75) Inventors: John J. Alberts, III; William H. Schmid; Scott A. Zaremba, all of Cadillac, MI (US)

(73) Assignee: Rexair, Inc., Troy, MI (US)

( * ) Notice: Subject to any disclaimer, the term of this patent is extended or adjusted under 35 U.S.C. 154(b) by 0 days.

(21) Appl. No.: 09/490,708

(22) Filed: Jan. 25, 2000

Related U.S. Application Data

(63) Continuation-in-part of application No. 09/298,137, filed on Apr. 23, 1999, now Pat. No. 6,162,287.

(51) Int. Cl.⁷ .................................................. B01D 47/02
(52) U.S. Cl. ........................... 96/333; 15/353; 55/DIG. 3; 96/337
(58) Field of Search ........................ 15/347, 353; 95/226; 55/DIG. 3, 372, 320, 418, 495, 502, 503, 504, DIG. 31; 96/351, 333, 334, 342, 348, 329, 340, 337, 338, 339

(56) References Cited

U.S. PATENT DOCUMENTS

| | | | |
|---|---|---|---|
| 2,102,353 | * 12/1937 | Brock | 96/334 |
| 2,184,731 | * 12/1939 | Brewer | 96/337 |
| 2,189,021 | * 2/1940 | Schury | 96/334 |
| 2,221,572 | * 11/1940 | Brock et al. | 96/333 |
| 2,954,095 | * 9/1960 | Brock | 96/342 |
| 3,234,713 | * 2/1966 | Harper et al. | 96/342 |
| 3,279,157 | 10/1966 | Andersson-Sason et al. . | |
| 3,609,946 | 10/1971 | Nakagawa et al. . | |
| 3,841,067 | 10/1974 | Kato et al. . | |
| 4,036,346 | 7/1977 | Livingston . | |
| 4,342,131 | 8/1982 | Reid . | |
| 4,547,206 | * 10/1985 | Sovis et al. | 55/DIG. 3 |
| 4,693,734 | * 9/1987 | Erickson, Jr. | 96/333 |
| 4,838,907 | 6/1989 | Perry . | |
| 4,851,017 | * 7/1989 | Erickson et al. | 96/351 |
| 5,022,115 | * 6/1991 | Kasper | 96/333 |
| 5,030,257 | * 7/1991 | Kasper et al. | 96/333 |
| 5,090,974 | * 2/1992 | Kasper et al. | 96/333 |

(List continued on next page.)

OTHER PUBLICATIONS

Copy of diagram of Rainbow Ultra–Low Penetrationsarrestor in German, No date.

*Primary Examiner*—Duane S. Smith
(74) *Attorney, Agent, or Firm*—Howard & Howard

(57) ABSTRACT

A filter assembly for a vacuum cleaner that includes a main housing having an inlet and an outlet. A motor moves air from the inlet to the outlet, and a first filter is arranged between the inlet and the outlet for filtering the air. An inner wall and an outer wall that is spaced apart from the inner wall form a cavity between the walls. The cavity is located between the first filter and the outlet. The inner wall has an inner opening that permits air to flow from the first filter into the cavity, and the outer wall has an outer opening. A back cover is removably secured to the outer wall over the outer opening to seal the cavity and guide the air from the cavity to the outlet. The back cover includes an access opening that is removably secured to the back cover over the access opening to seal the access opening. A filter cartridge is removably disposed within the cavity. The filter cartridge has a first side with a first opening and a second side opposite the first side and adjacent to the access cover with a second opening. The filter cartridge has a second filter, such as a HEPA filter, disposed therein between the first and the second openings for further filtering the air. A portion of the first side is in sealing engagement with a portion of the inner wall such that the first opening is aligned with the inner opening wherein the motor moves the air from the inner opening to the second opening.

15 Claims, 4 Drawing Sheets

U.S. PATENT DOCUMENTS

| | | |
|---|---|---|
| 5,096,475 | 3/1992 | Kasper et al. . |
| 5,125,129 * | 6/1992 | Kasper et al. .......................... 96/333 |
| 5,199,963 * | 4/1993 | Scarp ............................... 55/DIG. 3 |
| 5,259,087 | 11/1993 | Loveless et al. . |
| 5,280,666 | 1/1994 | Wood et al. . |
| 5,301,388 | 4/1994 | Zeren . |
| 5,339,487 | 8/1994 | Kasper . |
| 5,388,301 | 2/1995 | Bosyj et al. . |
| 5,535,500 | 7/1996 | Stephens et al. . |
| 5,537,710 | 7/1996 | Selewski et al. . |
| 5,685,894 * | 11/1997 | Bowerman et al. .................... 55/503 |
| 5,690,713 * | 11/1997 | Bowerman et al. .................... 55/503 |
| 5,752,997 * | 5/1998 | Roth ................................ 55/DIG. 3 |
| 5,924,642 | 7/1999 | Krebs et al. . |
| 5,961,677 * | 10/1999 | Scott ................................ 55/DIG. 3 |
| 6,162,287 * | 12/2000 | Rohn et al. ....................... 55/DIG. 3 |
| 6,174,350 * | 1/2001 | Rohn et al. ....................... 55/DIG. 3 |

* cited by examiner

FILTER ASSEMBLY FOR A VACUUM CLEANER

RELATED APPLICATION

This application is a continuation-in-part of assignee's application Ser. No. 09/302,212 filed Apr. 29, 1999, now U.S. Pat. No. 6,174,350, issued Jan. 16, 2001 (currently pending as continuation application Ser. No. 09/746,814, filed Dec. 22, 2000) which is a continuation-in-part application of application Ser. No. 09/298,137 entitled "Improved Filter for Vacuum Cleaner", filed Apr. 23, 1999, now U.S. Pat. No. 6,162,287, issued Dec. 19, 2000.

BACKGROUND OF THE INVENTION

This invention relates to a vacuum cleaner having primary and secondary filters, and more specifically, to an improved filter assembly f or use as a secondary filter.

Vacuum cleaners operate by filtering dirty air that flows through a main housing between a vacuum cleaner inlet and outlet. One well-known type of vacuum cleaner uses a primary filter that incorporates a basin filled with liquid, preferably water. A separator driven by a motor separates the dirt particles from the air and deposits them into the water. Although such filter arrangements can be highly effective, inevitably the vacuum cleaner filter is unable to filter all the air and smaller particles of dirt escape through the outlet. To address this problem, a secondary filter has been incorporated to further filter the air. The secondary filter is arranged between the primary filter and the outlet to trap very small dirt particles. A pleated fibrous filter, such as a HEPA filter, has been used that permits only virtually dirt-free air to be expelled from the vacuum cleaner outlet.

It is difficult to provide the vacuum cleaner user convenient access to the secondary filter located within the main housing when changing the filter. Several components have been used as part of the filter assembly, and may be eliminated to reduce cost. The filter has not been located within the housing in such a manner that ensures proper placement and easy replacement of the filter. Furthermore, when the user replaces the filter one is confronted with a dirty filter that is messy and undesirable in appearance. Therefore, what is needed is a self-contained filter assembly having fewer components that is self-locating for easy replacement.

SUMMARY OF THE INVENTION AND ADVANTAGES

The present invention provides a filter assembly for a vacuum cleaner that includes a main housing having an inlet and an outlet. A motor moves air from the inlet to the outlet, and a first filter is arranged between the inlet and the outlet for filtering the air. An inner wall and an outer wall that is spaced apart from the inner wall form a cavity between the walls. The cavity is located between the first filter and the outlet. The inner wall has an inner opening that permits air to flow from the first filter into the cavity, and the outer wall has an outer opening. A back cover is removably secured to the outer wall over the outer opening to seal the cavity and guide the air from the cavity to the outlet. The back cover includes an access opening that is removably secured to the back cover over the access opening to seal the access opening. A filter cartridge is removably disposed within the cavity. The filter cartridge has a first side with a first opening and a second side opposite the first side and adjacent to the access cover with a second opening. The filter cartridge has a second filter disposed therein between the first and the second openings for further filtering the air. A portion of the first side is in sealing engagement with a portion of the inner wall such that the first opening is aligned with the inner opening wherein the motor moves the air from the inner opening to the second opening.

Accordingly, the above filter assembly provides a self-contained filter assembly having fewer components that is self-locating for easy replacement.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
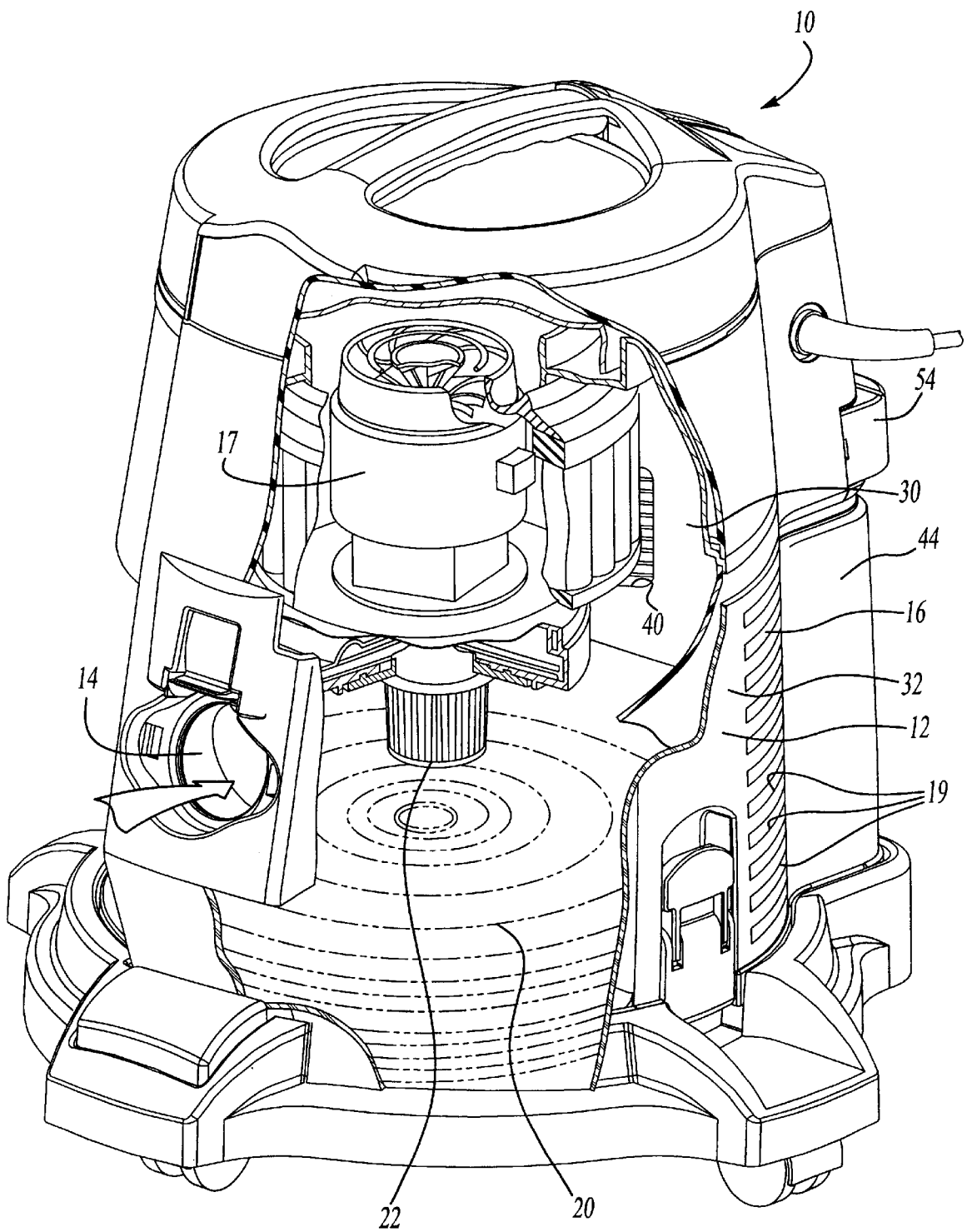
FIG. 1 is a partially broken perspective view of the vacuum cleaner of the present invention.
Figure 2:
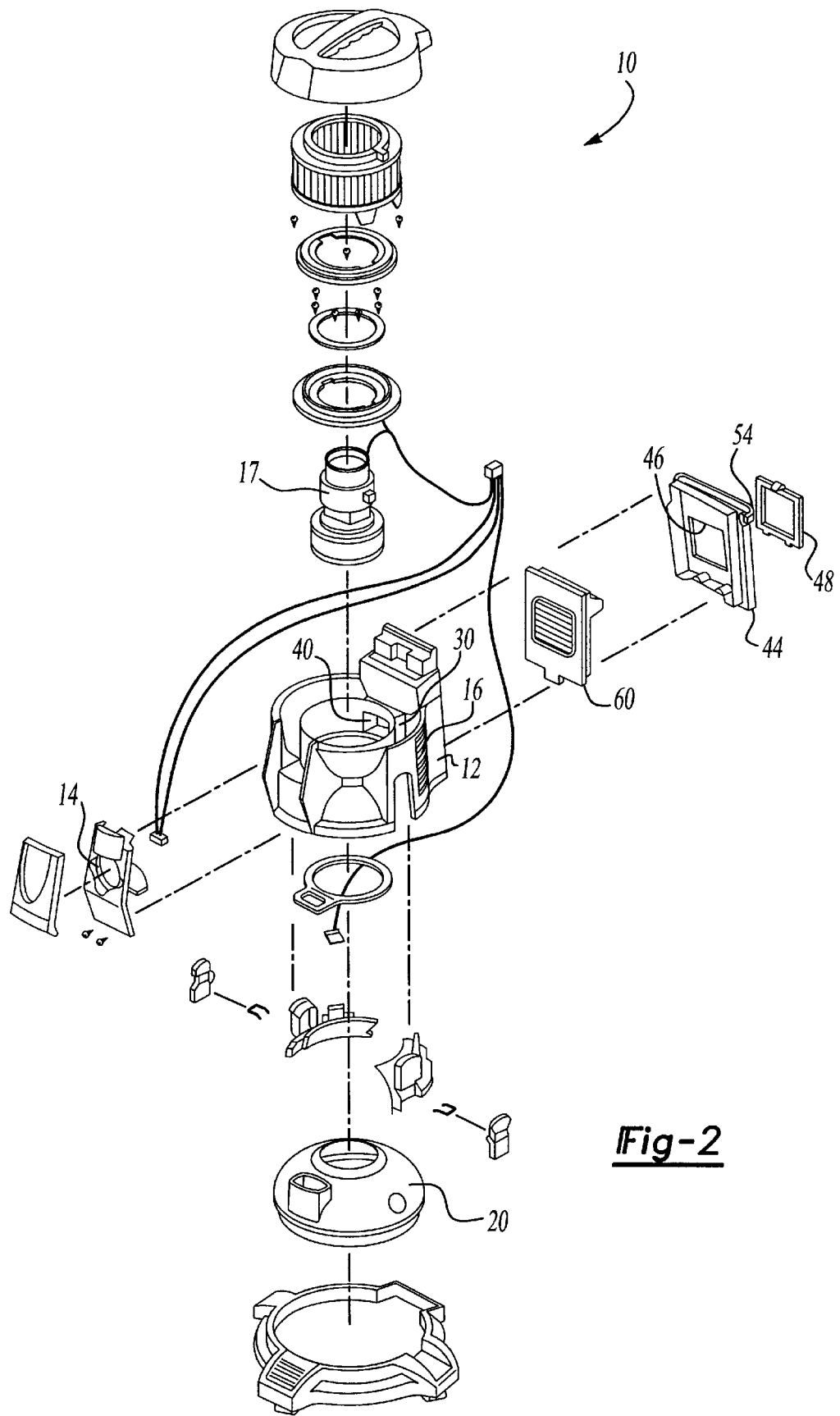
FIG. 2 is an exploded perspective view of the vacuum cleaner shown in FIG. 1.

A vacuum cleaner assembly is shown at 10 in FIGS. 1 and 2. Vacuum cleaners using a liquid basin or water pan filter are known to those skilled in the art as described in U.S. Pat. No. 5,096,475, which is hereby incorporated by reference to this specification. The vacuum cleaner assembly 10 includes a main housing 12 having an inlet 14 and an outlet 16. The inlet 14 is preferably a round opening adapted to receive a vacuum hose. The outlet 16 includes a plurality of slotted vents 19 opposite the inlet 14. A motor 17 is supported within the main housing 12 between the inlet 14 and the outlet 16 for drawing air into the inlet 14 and exhausting air outwardly through the outlet 16. A primary or first filter, such as a water pan 20 filled with a liquid filter medium such as water, is arranged below the motor 17 between the inlet 14 and outlet 16. A separator 22 is driven by the motor 17 for separating dirt particles in the air and depositing them into the water in the water pan 20.

Figure 3:
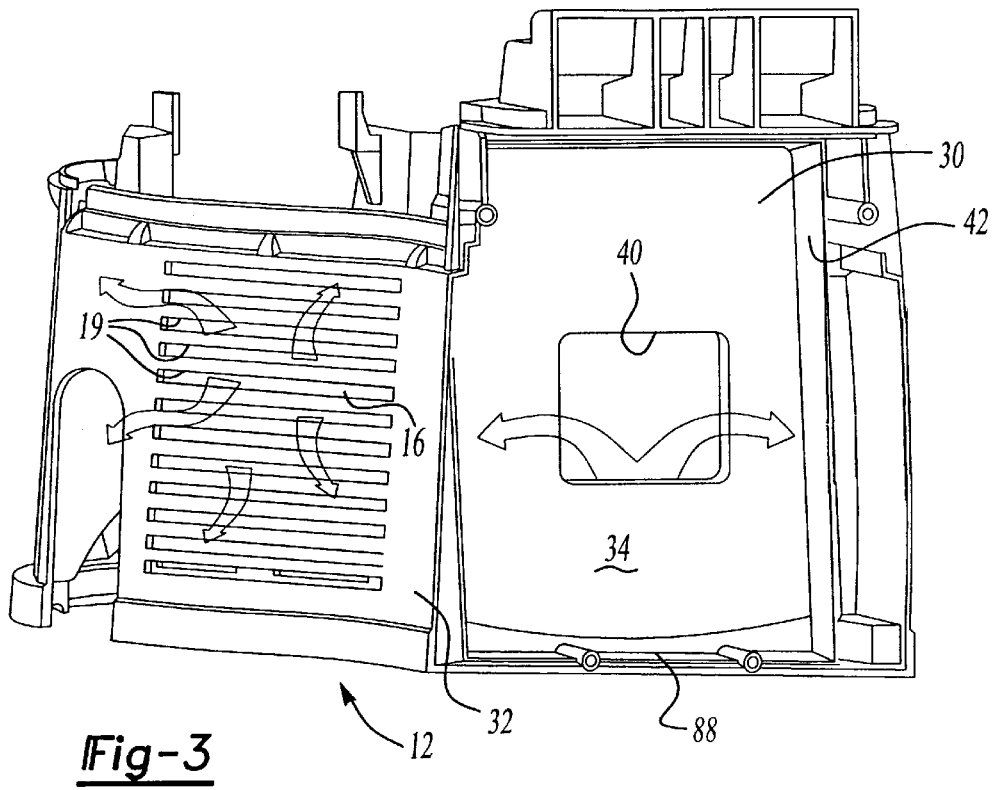
FIG. 3 is a partial rear perspective view of the vacuum cleaner of FIG. 1 with the back cover and filter cartridge of the present invention removed.

Referring to FIGS. 2 and 3, the main housing 12 has an inner wall 30 and an outer wall 32 spaced apart from the inner wall 30 forming a cavity 34 between the walls 30, 32. The main housing 12 may utilized several components to form the inner 30 and outer 32 walls. The cavity 34 is interposed between the water pan 20 and the outlet 16. The inner wall 30 has an inner opening 40 toward the interior of the main housing 12 that permits air to flow from the water pan 20 into the cavity 34. As shown in FIG. 3, air flows through the inner opening 40 and between the walls 30, 32, finally exiting through the outlet 16. The outer wall 32, or exterior wall of the main housing 12, has an outer opening 42 that provides access to the cavity 34. A back cover 44 is removably secured to the outer wall 32 over the outer opening 32 to seal the cavity 34 and guide or direct the air from the cavity 34 to the outlet 16.

Figure 4:
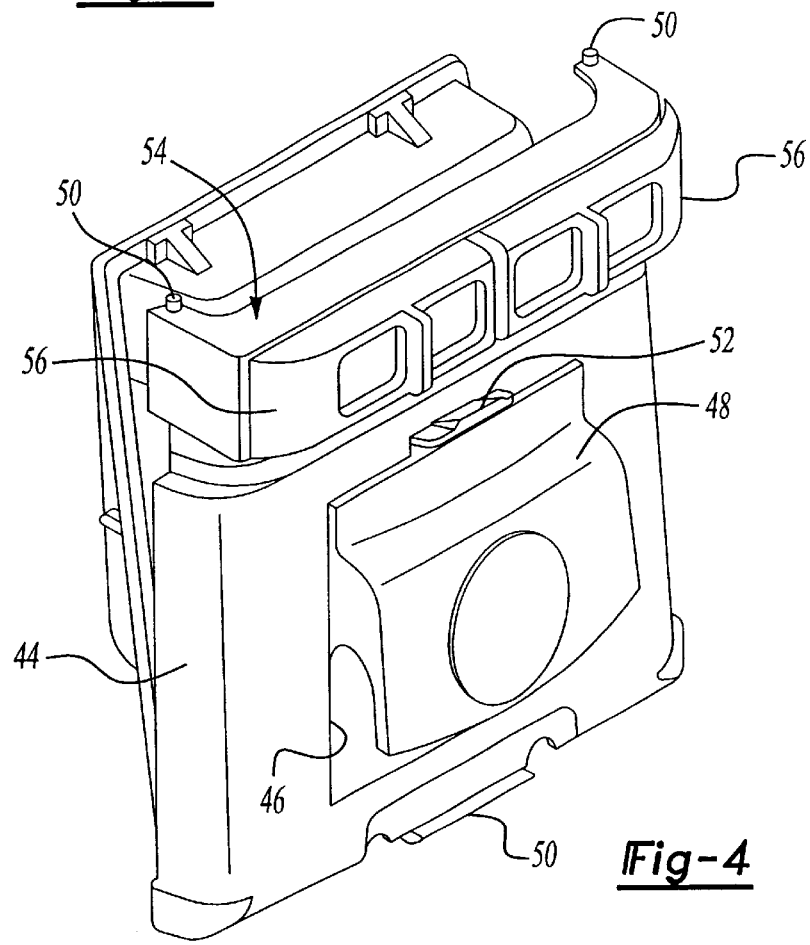
FIG. 4 is an exploded perspective view of the back cover and access cover of the present invention.

Referring to FIG. 4, the back cover 44 has an access opening 46 that is sealed by an access cover 48 removably secured to the back cover 44 over the access opening 46. The back cover 44 may be secured using threaded fastener, or tabs 50 integrally formed with the back cover 44 that coact with the outer wall 32. The access cover 48 is preferably secured to the back cover 44 by tabs 52. The access cover 48 is removed for use of a blower attachment, which is discussed in more detail below. The back cover 44 includes a cleat assembly 54 integral with the back cover 44 for stowing an electrical cord. The cleat assembly 54 is of the type disclosed in U.S. Pat. No. 5,924,642, which has retractable retaining arms 56 movable between retracted and extended positions. By incorporating the electrical cord cleat assembly 54 into the back cover 44, several components may be eliminated thereby simplifying assembly and reducing cost.

Figure 5:
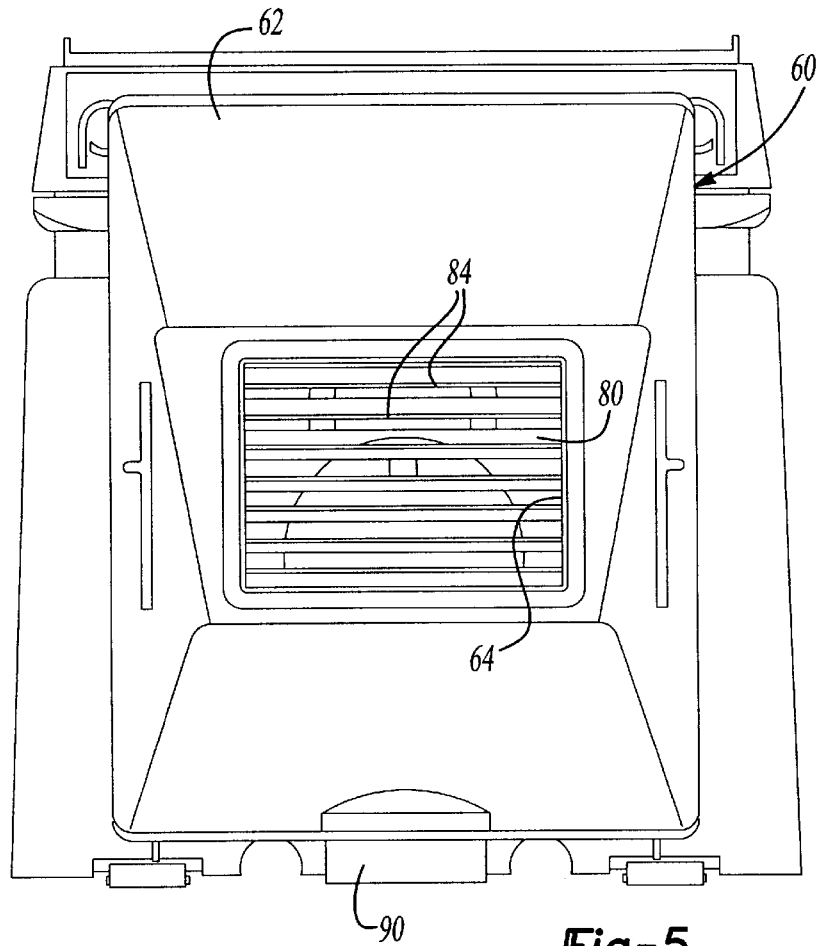
FIG. 5 is a rear perspective view of the filter cartridge of the present invention.
Figure 6:
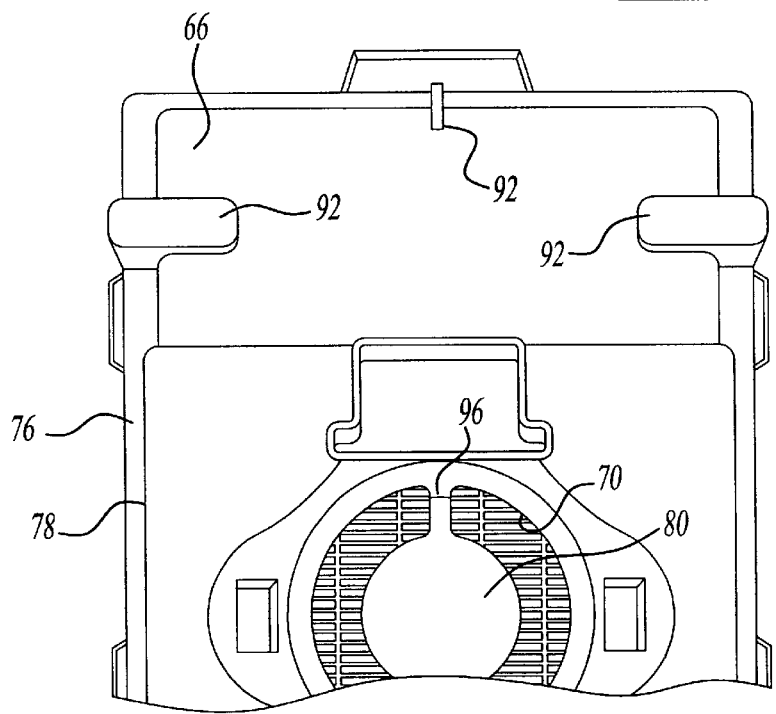
FIG. 6 is a front perspective view of the filter cartridge shown in FIG. 5.

The filter cartridge 60 of the present invention is removably disposed within the cavity 34. With reference to FIGS. 5 and 6, the filter cartridge 60 has a first side 62 with a first opening 64 and a second side 66 opposite the first side 62 with a second opening 70. The second side 66 is adjacent to the back cover 44 with the second opening 70 aligned with access cover 48. The filter cartridge 60 comprises first 76 and second 78 portions, respectively including first 62 and second 66 sides, are secured to one another, preferably by welding. A second filter 80, preferably a HEPA filter, is disposed between the portions 76, 78. Air flows through the filter 80 from the first opening 64 to the second opening 70. When the second filter 80 needs replacement, the whole filter cartridge 60 is replaced. In this manner, the messy filter 80 is retained within the clean filter cartridge 60 so that the used does not get dirty changing the filter 80. Additionally, a cleaner, more pleasing appearance is provided to the user.

A foam seal 82 is secured to a portion of the first side 62 around the first opening 64. The filter cartridge 60 is installed into the cavity 34 in sealing engagement with a portion of the inner wall 30 with the first opening 64 being aligned with the inner opening 40. The foam seal 82 ensures that the air flows through the second filter 80 and does not leak past the filter cartridge 60. The first portion 76 may include louvers 84 that extend across the first opening 64 for directing the air across the second filter 80 in a desired path.

To locate the filter cartridge 60 within the cavity 34, the outer wall 32 includes an aperture 88, preferably at the bottom of the outer opening 42. The filter cartridge 60 includes a downwardly depending tab 90 adapted to be received in the aperture 88 for locating the filter cartridge 60 within the cavity 34. When the back cover 44 is removed, the filter cartridge 60 may be tilted forward for removal from the cavity 34. The second portion 78 includes at least one outwardly extending leg 92 for coacting with the back cover 44 and locating the filter cartridge 60 at a distance from the back cover 44 to permit the air to flow from the second opening 70 to the outlet 16 uninhibited.

The second portion 78 includes a collar 96 about the second opening 70 for a blower attachment when the access cover 48 is removed. The blower attachment may then be installed into the collar 96.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A filter assembly for a vacuum cleaner comprising:
   a main housing having an inlet and an outlet;
   a motor for moving air from said inlet to said outlet;
   a first filter interposed between said inlet and said outlet for filtering the air;
   an inner wall and an outer wall spaced apart from said inner wall forming a cavity between said walls, said cavity interposed between said first filter and said outlet, said inner wall having an inner opening permitting air to flow from said first filter into said cavity and said outer wall having an outer opening;
   a back cover removably secured to said outer wall over said outer opening to seal said cavity and guide the air from said cavity to said outlet, said back cover having an access opening;
   an access cover removably secured to said back cover over said access opening to seal said access opening; and
   a filter cartridge removably disposed within said cavity, said filter cartridge having a first side with a first opening and a second side opposite said first side and adjacent to said access cover with a second opening, said filter cartridge having a second filter disposed therein between said first and said second openings for further filtering the air, and a portion of said first side in sealing engagement with a portion of said inner wall with said first opening being aligned with said inner opening wherein the motor moves the air from the inner opening to the second opening.

2. The assembly of claim 1 wherein said inner and said outer wall are formed by said main housing.

3. The assembly of claim 1 further comprising a separator driven by said motor, and wherein said first filter comprises a basin filled with liquid for filtering the air.

4. The assembly of claim 1 wherein said filter cartridge comprises first and second portions secured to one another with said second filter disposed therebetween, said first and said second portions having said first and said second openings respectively.

5. The assembly of claim 4 wherein said first and said second portions are secured to one another by welding said portions together.

6. The assembly of claim 4 wherein said first portion includes a foam seal attached thereto about said first opening for sealing against said inner wall.

7. The assembly of claim 6 wherein said first portion includes louvers extending across said first opening for directing the air across the second filter in a desired path.

8. The assembly of claim 4 wherein said outer wall includes an aperture and said filter cartridge includes a depending tab adapted to be received in said aperture for locating said filter cartridge within said cavity.

9. The assembly of claim 4 wherein said second portion includes at least one outwardly extending leg for coacting with said back cover and locating said filter cartridge at a distance therefrom to permit the air to flow from said second opening to said outlet.

10. The assembly of claim 4 wherein said second filter comprises a HEPA filter.

11. The assembly of claim 4 wherein said second portion includes a collar about said second opening for a blower attachment when said access cover is removed.

12. The assembly of claim 1 wherein said back cover includes a plurality of attachment tabs adapted to coact with said outer wall for removably securing said back cover thereto.

13. The assembly of claim 1 wherein said access cover includes a plurality of attachment tabs adapted to coact with said back cover for removably securing said access cover thereto.

14. The assembly of claim 1 wherein said back cover includes a cleat assembly integral with said back cover for stowing an electrical cord, said cleat having retractable retaining arms movable between retracted and extended positions.

15. A filter assembly for a vacuum cleaner comprising:
   a main housing having an inlet and an outlet;
   a motor for moving air from said inlet to said outlet;
   a first filter interposed between said inlet and said outlet for filtering the air;
   an inner wall and an outer wall spaced apart from said inner wall forming a cavity between said walls, said cavity interposed between said first filter and said outlet, said inner wall having an inner opening and said outer wall having an outer opening;
   a back cover removably secured to said outer wall over said outer opening, said back cover having an access opening;
   an access cover removably secured to said back cover over said access opening; and
   a filter cartridge removably disposed within said cavity, said filter cartridge having a first side with a first opening and a second side adjacent to said access cover with a second opening, said filter cartridge having a second filter disposed between said first and said second sides, and a portion of said first side in sealing engagement with a portion of said inner wall with said first opening being, aligned with said inner opening.

* * * * *